United States Patent [19]

Frenier

[11] 4,310,435

[45] * Jan. 12, 1982

[54] METHOD AND COMPOSITION FOR REMOVING SULFIDE-CONTAINING SCALE FROM METAL SURFACES

[75] Inventor: Wayne W. Frenier, Tulsa, Okla.

[73] Assignee: The Dow Chemical Co., Midland, Mich.

[*] Notice: The portion of the term of this patent subsequent to Sep. 2, 1997, has been disclaimed.

[21] Appl. No.: 100,794

[22] Filed: Dec. 6, 1979

[51] Int. Cl.$^3$ ............................................... C02F 5/10
[52] U.S. Cl. ..................................... 252/180; 252/148; 252/181; 252/86; 252/87; 252/8.55 E; 422/12; 134/40; 134/41
[58] Field of Search ................. 252/148, 180, 181, 86, 252/87, 8.55 E; 134/40, 41; 422/12

[56] References Cited

U.S. PATENT DOCUMENTS

| | | | |
|---|---|---|---|
| 2,606,873 | 8/1952 | Cardwell et al. | 252/148 |
| 3,077,454 | 2/1963 | Monroe et al. | 252/148 |
| 3,335,090 | 8/1967 | Davidowitch et al. | 252/148 |
| 3,669,613 | 6/1972 | Knox et al. | 252/148 |

*Primary Examiner*—Mayer Weinblatt
*Attorney, Agent, or Firm*—L. W. White

[57] ABSTRACT

The method of chemically cleaning acid-soluble, sulfide-containing scale from a metal surface using an aqueous cleaning composition comprising an aqueous non-oxidizing acid having one or more aldehydes dissolved or dispersed therein is improved by generating the aldehyde in situ. An aqueous acid cleaning composition comprising hydrochloric or sulfuric acid and hexamethylene tetramine is a preferred composition.

8 Claims, No Drawings

4,310,435

METHOD AND COMPOSITION FOR REMOVING SULFIDE-CONTAINING SCALE FROM METAL SURFACES

BACKGROUND OF THE INVENTION

1. Field of the Invention

This invention pertains to an improved method of chemically cleaning sulfide-containing scale from metal surfaces. The novel process utilizes aqueous acid cleaning solutions containing an aldehyde in amounts sufficient to prevent or substantially prevent the evolution of hydrogen sulfide gas, and the aldehyde is generated in situ.

2. Description of the Prior Art

Many sources of crude oil and natural gas contain high amounts of hydrogen sulfide. Refineries processing such crude oil or natural gas commonly end up with substantial amounts of sulfide-containing scale on the metal surfaces in contact with the crude oil or gas. This scale is detrimental to the efficient operation of heat exchangers, cooling towers, reaction vessels, transmission pipelines, furnaces, etc. Removal of this sulfide-containing scale has been a substantial problem because conventional acidcleaning solutions react with the scale and produce gaseous hydrogen sulfide.

Hydrogen sulfide gas produced during the cleaning operation leads to several problems. First, hydrogen sulfide is an extremely toxic gas and previous techniques have required the entire system to be vented to an appropriate flare system (in which the gas is burned) or to a sodium hydroxide scrubbing system. Neither of these alternatives is very attractive because the sulfur dioxide and sulfur trioxide formed during the burning of hydrogen sulfide are substantial pollutants in and of themselves. The sodium sulfide produced during the scrubbing system is a solid that presents disposal problems. It can be land-filled or put into disposal ponds but only under conditions such that the sodium sulfide does not contact acid. Sodium sulfide reacts rapidly with acids to regenerate hydrogen sulfide. Second, aside from the toxic nature of hydrogen sulfide, the material causes operational problems as well because it is a gas. The volume of gas produced can be substantial. The gas takes up space within the unit being cleaned and can prevent the liquid cleaning solution from coming in contact with all of the metal surfaces. This can occur, for example, in cleaning a horizontal pipeline where the gas can form a "pad" over the top of the flowing liquid and prevent the liquid from filling the pipeline and cleaning the entire surface. The gas produced can also cause the pumps used in the system to cavitate, lose prime, and/or cease to function efficiently. And, of course, if enough gas is generated in a confined vessel the vessel can rupture.

These problems have been encountered in the industry and are severe.

Hydrogen sulfide and acid cleaning solutions containing hydrogen sulfide can cause severe corrosion problems on ferrous metals. The corrosion can be due to attack by acid and/or ferric ion corrosion. These corrosion problems have been met in the past by including minor amounts of corrosion inhibitors in the system. Aldehyde and aldehyde condensation products (normally with an amine) have been used as corrosion inhibitors in various systems. For example, they have been used alone or in combination with other corrosion inhibitors in aqueous acidic cleaning solutions and pickling baths or as an additive to crude oil. Under these systems, however, the aldehyde was included in very minor amounts. The following patents are representative of how these aldehydes have been previously used in this regard: U.S. Pat. No. 2,426,318; U.S. Pat. No. 2,606,873; U.S. Pat. No. 3,077,454; U.S. Pat. No. 3,514,410; and U.S. Pat. No. 3,669,613.

The reaction of hydrogen sulfide with an aldehyde is a known reaction which has been the subject of some academic interest. See, for example, the journal articles abstracted by Chemical Abstracts in C.A.54:17014h; C.A.63:14690a; C.A.65:9026d. The references indicate that the product formed by hydrogen sulfide with formaldehyde is trithiane or low polymers. This product was also referred to in U.S. Pat. No. 3,669,613 cited above. In these references, the product was produced by bubbling hydrogen sulfide through the aqueous acid/formaldehyde systems and the patent indicates that the reaction should not be attempted at temperatures greater than about 45° C. The patent also indicates that the reaction usually reaches completion in from about 5½ hours to about 9½ hours at ambient temperatures.

None of the references taught or suggested the unique phenomenon observed by Frenier et al. and described in their U.S. patent application Ser. No. 967,047, filed Dec. 6, 1978, entitled "Composition and Method for Removing Sulfide-containing Scale From Metal Surfaces" (the disclosure of which is incorporated herein by reference). Frenier et al. discovered that acid-soluble, sulfidecontaining scale could be effectively removed from metal surfaces without the release of gaseous hydrogen sulfide by use of an aqueous acid cleaning composition comprising an aqueous non-oxidizing acid having at least one aldehyde dissolved or dispersed therein, with the aldehyde being present in such compositions in an amount at least sufficient to prevent or substantially prevent the evolution of hydrogen sulfide gas. This required at least a stoichiometric amount of aldehyde in the cleaning solution (i.e. at least one mole of aldehyde per mole of hydrogen sulfide produced during the cleaning) and an excess of aldehyde was preferred. By excess was meant, amounts beyond stoichiometric required and up to one equivalent weight of aldehyde or more per equivalent weight of acid. Their best system was an aqueous sulfuric acid cleaning solution containing excess formaldehyde.

The discovery by Frenier et al. represented a technical breakthrough in the chemical cleaning industry. Their discovery has been commercialized and widely accepted.

SUMMARY OF THE INVENTION

It has now been discovered that the Frenier et al. cleaning process is improved by generating the aldehyde in situ. Thus, the present invention is in the method of chemically cleaning acid-soluble, sulfide-containing scale from a metal surface comprising contacting said scale with an aqueous acid cleaning composition comprising an aqueous non-oxidizing acid having at least one aldehyde dissolved or dispersed therein, which aldehyde is present in an amount at least sufficient to prevent or substantially prevent the evolution of hydrogen sulfide gas, the improvement comprising generating said aldehyde(s) in situ.

DETAILED DESCRIPTION OF THE INVENTION

By conducting the cleaning process according to the present invention, one can avoid procedural problems of handling aldehydes per se.

The compositions used in the present invention can be formulated by any convenient procedure which results in the formation of the aqueous acid cleaning composition defined above. This result is most easily achieved by combining an aqueous non-oxidizing acid with an aldehydereleasing organic compound which has a low vapor pressure and is soluble or dispersable in the acid. Preferrably, such aldehyde-releasing organic compounds are formaldehydereleasing compounds. Examples of such aldehyde-releasing compounds are Schiff bases, condensation products of ammonia or primary amines with aldehydes, etc. Along these, the class of compounds which are condensation products of ammonia or aliphatic primary amines with formaldehydes are preferred and the condensation product of ammonia with formaldehyde is most preferred.

In many instances, acid is consumed during the process of generating the aldehyde in situ. This is easily determined by standard analytical techniques. The point being, it may be necessary in formulating the aqueous acid cleaning compositions to allow for this consumption of acid so that the final formulated material has sufficient acid strength to clean the acid-soluble, sulfide-containing scale at a commercially acceptable rate.

Likewise, the amount of aldehyde which has been generated in situ can be easily predetermined and/or measured experimentally by conventional methods. The result desired is to have sufficient aldehyde present in the aqueous acid cleaning composition to prevent the evolution of hydrogen-sulfide gas when the cleaning solution comes in contact with the scale. The stoichiometry of the reaction requires one mole of aldehyde per mole of hydorgen sulfide which will be generated. Excess aldehyde is again preferred. Frequently the aqueous acid cleaning solutions containing the aldehyde are generated external to the item or vessel to be cleaned.

In cleaning an item or vessel that will require circulation of the aqueous acid cleaning solution (e.g. a contacting tower, heat exchanger or furnace), it is preferred to ascertain the circulation path within the system using water. The aldehyde generating chemical can then be added to the water after which concentrated acid can be added until the desired cleaning concentration is achieved. This represents a preferred embodiment for cleaning many, if not most, systems since the aldehyde is always present in excess and effective elimination of gaseous hydrogen sulfide is assured.

The Frenier et al. patent application describes the aqueous acid cleaning compositions in substantial detail as well as the techniques for their use. Its disclosure has been incorporated by reference and so it would be redundant to repeat the information here. The primary distinction between the instant invention and the Frenier et al. invention resides in generating the aldehyde in situ.

The following examples will further illustrate the invention:

EXAMPLE 1

A solution of hexamethylenetetramine (HMTA; 5.5 g) dissolved in 150 milliliters of 14 percent (by weight) aqueous hydrochloric acid was charged to a reaction vessel having a mechanical stirrer and a gas collecting means. Powdered iron sulfide (FeS; 9.6 g) was added to the stirred aqueous acid solution. The mixture was then heated to 150° F. and stirrred for 3.5 hours. During this time, approximately 65 percent of the iron sulfide dissolved and 32 milliliters of gas collected. This gas was tested for hydrogen sulfide using lead acetate paper. The results were negative.

EXAMPLE 2

A pipe specimen (1"×4"×¼") from a petroleum refinery furnace was obtained which was heavily fouled with a deposit containing iron sulfide. The specimen was placed in a 2 liter jacketed flask attached to a gas collecting means. The specimen was submerged in 600 milliliters of a solution containing 14 percent (by weight) aqueous hydrochloric acid and 20 g HMTA and the flask sealed. The contents of the vessel were then heated to 150° F. and maintained at this temperature for 6 hours. No measurable amount of gas was observed or collected. The surface of the pipe specimen was essentially free of scale.

The "spent solvent" was analyzed in each of Examples 1 and 2 and found to contain 2.5 and 1.5 weight percent dissolved iron, respectively.

We claim:

1. In the method of chemically cleaning acid-soluble, sulfide-containing scale from a metal surface comprising contacting said scale with an aqueous acid cleaning composition comprising an aqueous non-oxidizing acid having at least one aldehyde dissolved or dispersed therein, which aldehyde is present in an amount at least sufficient to prevent or substantially prevent the evolution of hydrogen sulfide gas, the improvement comprising generating said aldehyde in situ.

2. The improvement defined by claim 1 wherein said aldehyde is generated by combining an aldehyde-releasing organic compound and an aqueous non-oxidizing acid medium.

3. The improvement defined by claim 2 wherein said aldehyde-releasing organic compound is a formaldehydereleasing compound.

4. The improvement defined by claim 3 wherein said formaldehyde-releasing compound is a condensation product of ammonia or a primary aliphatic amine with formaldehyde.

5. The improvement defined by claim 4 wherein said aldehyde-releasing compound is hexamethylene tetramine.

6. The improvement defind by claim 5 wherein said non-oxidizing acid is hydrochloric acid or sulfuric acid.

7. The improvement defined by claim 6 wherein said aqueous acid cleaning composition additionally comprises a compatible acid-corrosion inhibitor.

8. The improvement defined by claim 7 wherein said corrosion inhibitor is a compatible amine-based corrosion inhibitor.

* * * * *